July 25, 1950  A. L. MORSE  2,516,237
FOLDING SHELF SUPPORT

Filed Nov. 17, 1948  3 Sheets-Sheet 1

Inventor:
Arthur L. Morse,
by Kenney, Jenney, Witter & Hildreth
Attorneys

July 25, 1950           A. L. MORSE           2,516,237
FOLDING SHELF SUPPORT
Filed Nov. 17, 1948           3 Sheets-Sheet 2
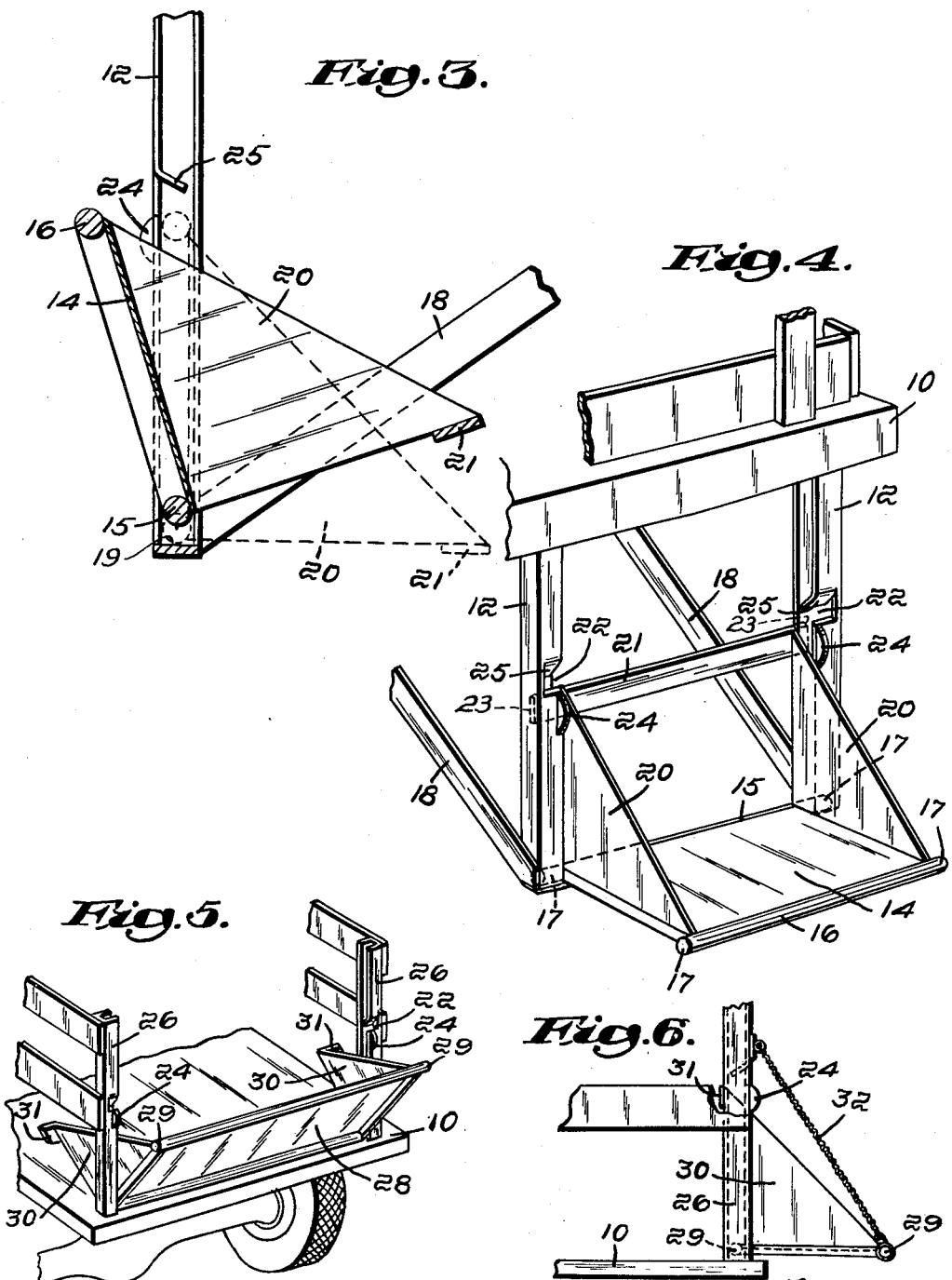

July 25, 1950

A. L. MORSE 2,516,237

FOLDING SHELF SUPPORT

Filed Nov. 17, 1948

3 Sheets-Sheet 3

Inventor:
Arthur L. Morse,
by Munday, Jenney, Witter & Hildreth
Attorneys

Patented July 25, 1950

2,516,237

UNITED STATES PATENT OFFICE 2,516,237

FOLDING SHELF SUPPORT

Arthur L. Morse, Auburndale, Mass.

Application November 17, 1948, Serial No. 60,571

8 Claims. (Cl. 280—166)

This invention relates to a new and improved folding shelf support adapted to various uses such as a step for vehicles, a tailboard for trucks, a folding seat, etc. The primary object of the invention resides in the production of an improved and compact combination constructed economically from channel iron and like standard stock and providing a versatile support of this nature adapted to many uses. The support is movable to open and closed positions and an important feature of the invention resides in a novel arrangement wherein the shelf remains secure in closed position by its own weight and can be conveniently and quickly moved therefrom to the open position.

These and other features of the invention will be more readily understood and appreciated from the following detailed description of preferred embodiments thereof, selected for purposes of illustration and shown in the accompanying drawings in which—

Figure 1:
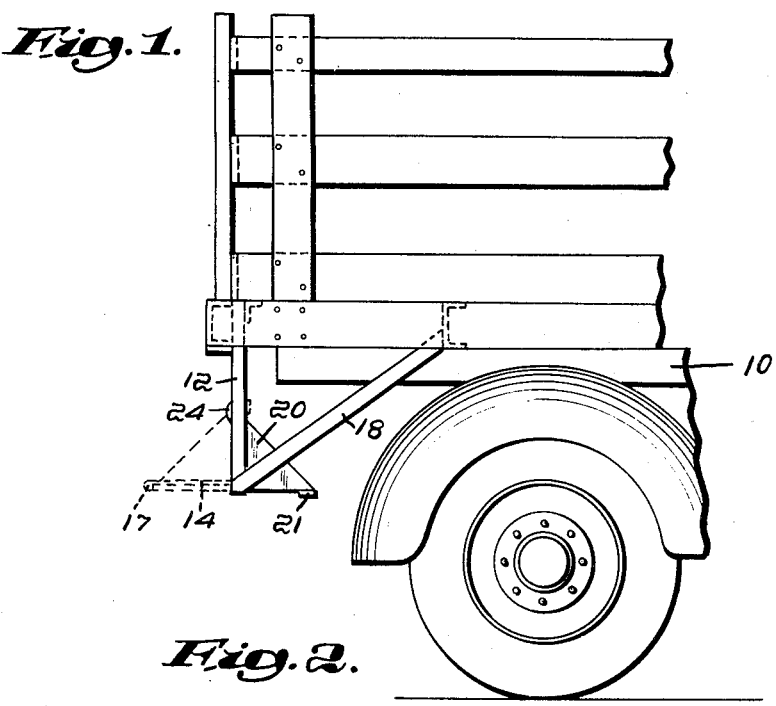
Figure 2:
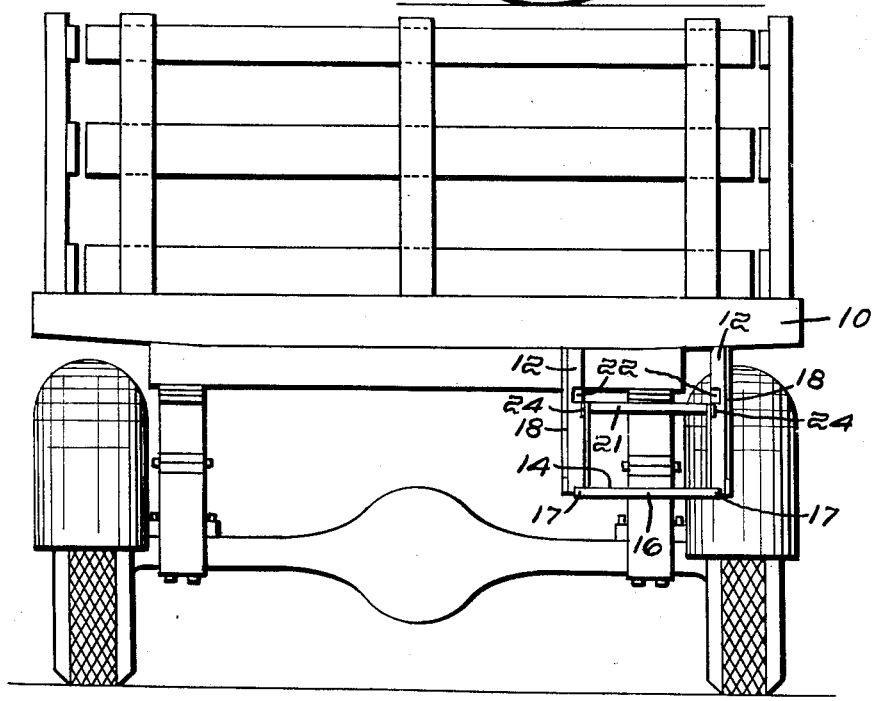
Figure 7:
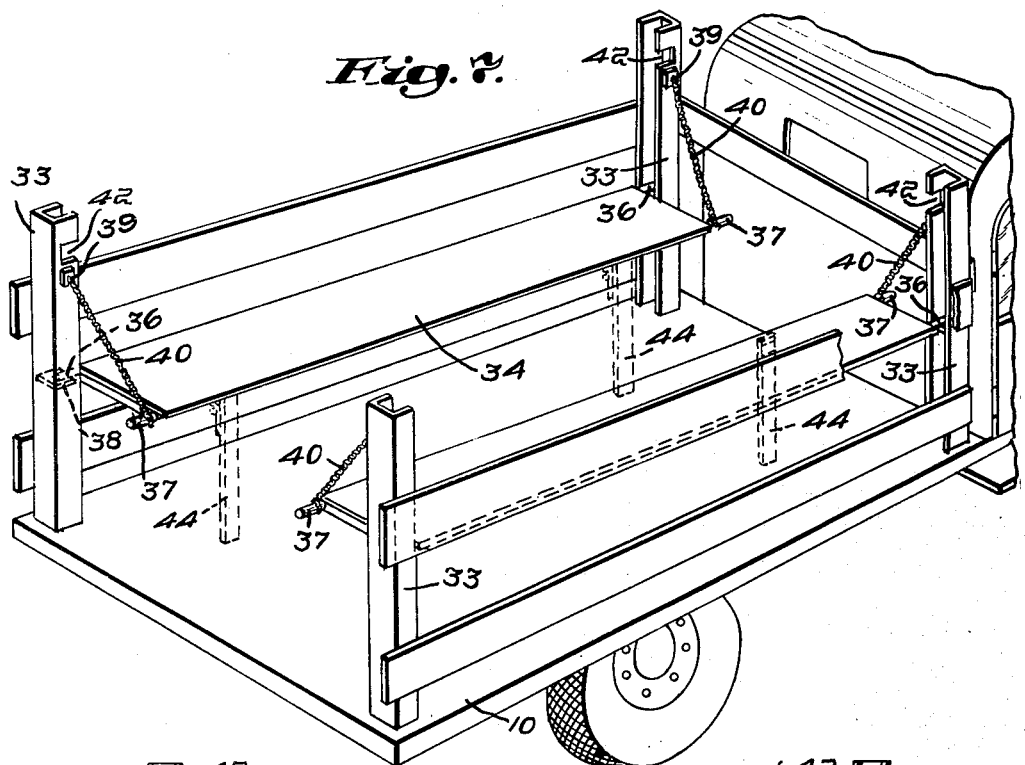
Figure 8:
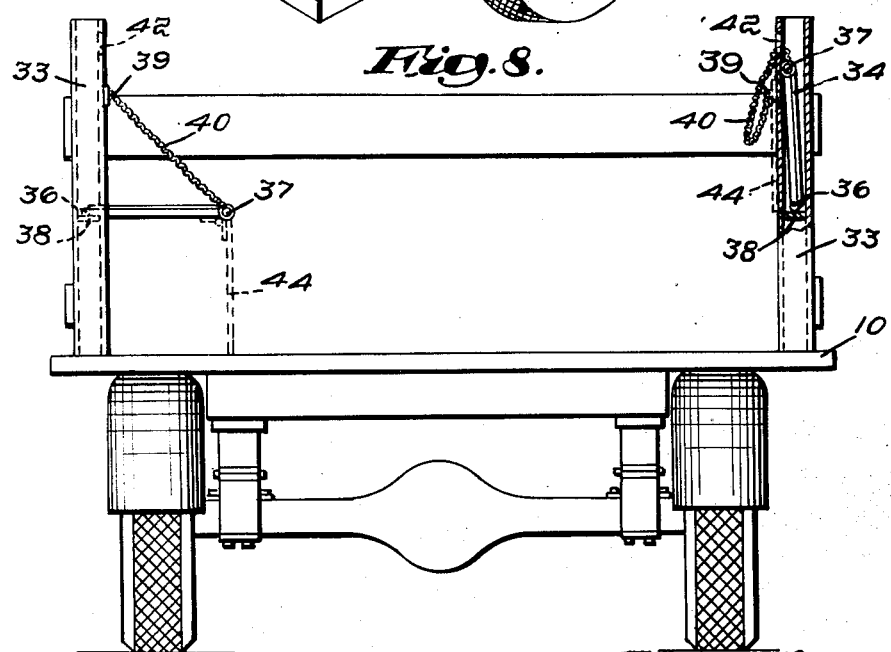

Fig. 1 is a fragmentary side elevation of a truck equipped with a step unit embodying my invention, Fig. 2 is a rear view thereof, Fig. 3 is a sectional view transversely through the step unit, Fig. 4 is a perspective view showing the step unit in open position, Fig. 5 is a perspective view of a truck equipped with a tailboard embodying my invention, Fig. 6 is a fragmentary view of a modified construction, Fig. 7 is a perspective view of a truck equipped with two seats embodying my invention, and Fig. 8 is a rear view thereof.

Referring first to Figs. 1–4 of the drawings showing a truck step unit embodying my invention, 10 indicates the truck body. The step unit is mounted beneath and to the rear end of the body. The unit embodies two channel irons 12 hung in spaced and parallel relation from the body and having open channels facing each other. A step 14 embodies two rods 15 and 16 at its two longitudinal margins and the ends of the rods provide four trunnions 17 extending outwardly beyond the ends of the step adjacent to its four corners. The two trunnions of the rod 15 extend into the two channels with the step located between the channel irons and these two trunnions resting on abutments 19 at the bottom ends of the channel irons provide a pivotal support for the step. The bottom ends of the channel irons are braced by bars 18 extending upwardly and forwardly to the truck body.

The step unit has two triangular end plates 20 rigid with the step and carrying a bar 21 with its two ends extending outwardly beyond the unit and providing lugs 23 for engaging the rear faces of the channel irons and suporting the step disposed in open horizontal position forwardly of the channel irons as shown in Fig. 4. The front walls of the channel irons have two openings 22 into the channels to receive the two trunnion ends 17 of the rod 16. When closing the step unit these two trunnions are adapted to pass through these openings into the channels, two lugs 24 being provided on the channel irons for guiding the trunnions into the openings. The openings are located a distance above the bottom of the channels greater than the distance between the two trunnions at each end of the step whereby the step is held in closed position by its own weight and can be conveniently and quickly moved therefrom to the open position merely by lifting the unit up to a position permitting the top trunnions to pass outwardly of the openings. In forming the openings 22 a portion of the front wall is bent inwardly to provide stops 25 for guiding the top trunnions 17 out of the openings.

In Fig. 5 I have illustrated my invention as embodied in a tailboard for a truck. This construction and its functioning are substantially the same as in the step unit above described. The two channel irons 26 are mounted at the two rear corners of the truck body and provided with two inwardly facing channels. The board 28 has four trunnions 29 at its corners for engaging within the channels. The two end plates 30 are provided with two outwardly projecting lugs 31 for engaging the rear faces of the channel irons and supporting the board in open horizontal position forwardly of the channel irons in the same manner as the step illustrated in Fig. 4. The tailboard is also held in closed position in the same manner by disposing the trunnions within the open channels. The tailboard can be provided with chains 32 in lieu of or together with the lugs 31. as illustrated in Fig. 6.

In Figs. 7 and 8 I have shown a truck equipped with two seats each embodying my invention. These two seats are illustrated as disposed along opposite sides of the truck and a description of one will suffice.

Two channel irons 33 are mounted at the front and rear corners at each side of the truck body and provided with open channels facing each other. A seat 34 is provided with four trunnions 36 and 37 extending outwardly beyond the ends of the seat adjacent to its four corners, two trunnions 36 being in axial alignment at the rear longitudinal margin of the seat and two trunnions 37 being in axial alignment at the front margin. A lug 38 is mounted in each channel iron at seat high elevation for receiving and supporting a trunnion 36. A chain 40 is connected at one end to each end of the seat adjacent and preferably to a trunnion 37 and its other end is anchored at 39 to the channel iron above the lug 38.

When the seat is in open position each trunnion 36 rests on a lug 38 providing a bottom for the channel and the chains are of a length to support the seat in horizontal position. The seat is moved to the idle position by passing the trunnions 37 through the openings 42 and dropping the seat downwardly where it remains supported on the lugs 38 and disposed vertically between the two channel irons. The openings 42 are located above the trunnions 37 whereby the trunnions and seat will be housed vertically between the two channel irons. It will be apparent that this construction provides a very useful seat accommodation which can be folded entirely out of the way when the truck is to be used for other trucking purposes.

It will be apparent that various equivalent modifications can be provided such, for example, as a plurality of supporting legs in lieu of the chains 40. In Fig. 7 I have illustrated in broken lines two such legs 44 pivoted to the forward margin of the seat. These legs are housed vertically along with the seat between the channels when the seat is not in use.

Having thus disclosed my invention what I claim as new and desire to secure by Letters Patent is:

1. A folding shelf support, comprising two relatively spaced uprights having opposed channels facing each other, a shelf, four trunnions carried by and extending outwardly beyond the ends of the shelf adjacent to its four corners, two of the trunnions being in axial alignment adjacent to one longitudinal margin of the shelf and the other two trunnions being in axial alignment and spaced from the first two trunnions transversely of the shelf, each two aligned trunnions being spaced apart a distance to extend into the two channels with the shelf disposed therebetween, two abutments associated with the two uprights for receiving and supporting two aligned trunnions, and other means at the ends of the shelf supplementing the abutments for maintaining the shelf in horizontal position, the uprights having trunnion receiving openings in the channels located above the bottoms of the channels a distance greater than the distance between the two trunnions at each end of the shelf.

2. The shelf support defined in claim 1 in which said other means comprises two flexible elements respectively attached at one end to the ends of the shelf at points remote from the trunnions supported on the abutments and anchored at the other end to the uprights above said abutments.

3. The shelf support defined in claim 1 in which said other means comprises two flexible elements each attached at one end to said other two trunnions and anchored at their other ends above said abutments.

4. The shelf support defined in claim 1 in which said other means comprises a plurality of supporting legs pivoted to the shelf adjacent to the longitudinal margin opposite to the trunnions supported on the abutments.

5. The shelf support defined in claim 1 in which said other means comprises two lugs rigidly attached to the shelf in position to engage the two uprights and support the shelf in horizontal position.

6. The shelf support defined in claim 5 plus two end plates rigidly attached to the ends of the shelf and carrying said lugs remote from the shelf and disposed thereabove when the shelf is in said horizontal position.

7. The shelf support defined in claim 6 in which said lugs comprise the ends of a bar attached to said end plates and of a length overlapping the uprights at its ends.

8. A folding truck shelf unit comprising two parallel and vertically extending channel irons in spaced relation and having open channels facing each other, a shelf, four trunnions carried by and extending outwardly beyond the ends of the shelf adjacent to its four corners, two of the trunnions being in axial alignment adjacent to one margin of the shelf and the other two trunnions being in axial aligment adjacent to the other margin of the shelf, two of the aligned trunnions being disposed within the two channels with the shelf located between the channel irons, the front walls of the channel irons having two openings into the channels to receive the other two trunnions, said openings being located a distance above the bottom of the channels greater than the distance between the two trunnions at each end of the shelf, and means including end plates and lugs carried by the shelf unit at the ends of the shelf for engaging the rear faces of the channel irons and supporting the shelf disposed in open horizontal position forwardly of the channel irons.

ARTHUR L. MORSE.

REFERENCES CITED

The following references are of record in the file of this patent:

UNITED STATES PATENTS

| Number | Name | Date |
|---|---|---|
| 327,830 | Skiles | Oct. 6, 1885 |
| 2,246,985 | Pellegrini | June 24, 1941 |
| 2,324,508 | Johnson | June 20, 1943 |